(12) United States Patent
Tateishi

(10) Patent No.: US 8,278,889 B2
(45) Date of Patent: Oct. 2, 2012

(54) ADAPTIVE RECTIFIER ARCHITECTURE AND METHOD FOR SWITCHING REGULATORS

(75) Inventor: Tetsuo Tateishi, Aichi (JP)

(73) Assignee: Texas Instruments Incorporated, Dallas, TX (US)

( * ) Notice: Subject to any disclaimer, the term of this patent is extended or adjusted under 35 U.S.C. 154(b) by 541 days.

(21) Appl. No.: 12/152,795

(22) Filed: May 16, 2008

(65) Prior Publication Data
US 2008/0298106 A1   Dec. 4, 2008

Related U.S. Application Data

(60) Provisional application No. 60/940,736, filed on May 30, 2007.

(51) Int. Cl.
*G05F 1/00* (2006.01)

(52) U.S. Cl. .......................... 323/271

(58) Field of Classification Search .......... 323/282, 323/271; 330/2; 363/127
See application file for complete search history.

(56) References Cited

U.S. PATENT DOCUMENTS

| | | | |
|---|---|---|---|
| 4,356,450 A * | 10/1982 | Masuda | 330/9 |
| 5,789,974 A * | 8/1998 | Ferguson et al. | 330/2 |
| 6,271,712 B1 | 8/2001 | Ball | |
| 6,643,145 B1 | 11/2003 | Harrison | |
| 6,815,936 B2 | 11/2004 | Wiktor et al. | |
| 7,030,596 B1 * | 4/2006 | Salerno et al. | 323/282 |
| 7,072,198 B2 * | 7/2006 | Krug et al. | 363/127 |
| 7,268,525 B2 * | 9/2007 | Ishii et al. | 323/282 |
| 7,309,977 B2 * | 12/2007 | Gray et al. | 323/284 |
| 7,321,222 B2 * | 1/2008 | Hojo | 323/224 |
| 2003/0133313 A1 | 7/2003 | Criscione | |
| 2007/0081371 A1 | 4/2007 | Wittenbreder, Jr. | |

* cited by examiner

*Primary Examiner* — Adolf Berhane
*Assistant Examiner* — Yemane Mehari
(74) *Attorney, Agent, or Firm* — William B. Kempler; Wade J. Brady, III; Frederick J. Telecky, Jr.

(57) ABSTRACT

An adjustable compensation offset voltage is applied to a comparator to vary turn-off timing of a synchronous rectifier. A comparator output indicates when current through an inductor coupled to the synchronous rectifier should be approaching zero. If the synchronous rectifier is turned off before the current through the inductor reaches zero, the compensation offset voltage is adjusted to delay the synchronous rectifier turn-off for the next switching cycle. If the synchronous rectifier is turned off after the current through the inductor reaches zero, the compensation offset voltage is adjusted to advance the synchronous rectifier turn-off for the next switching cycle. An up/down counter, in conjunction with a digital to analog converter, may be used to provide the adjustment to the compensation offset voltage. The adjustable compensation offset voltage improves the accuracy of synchronous rectifier turn-off in relation to a zero inductor current, thereby improving power converter efficiency.

19 Claims, 4 Drawing Sheets

ADAPTIVE RECTIFIER ARCHITECTURE AND METHOD FOR SWITCHING REGULATORS

CROSS REFERENCE TO RELATED APPLICATIONS

This application is based on and claims benefit of Provisional Application No. 60/940,736, filed May 30, 2007.

STATEMENT REGARDING FEDERALLY SPONSORED RESEARCH OR DEVELOPMENT

N/A

BACKGROUND OF THE INVENTION

The present disclosure relates generally to power supply compensation, and more particularly to power supply parameter adjustment to improve light load efficiency.

Light load efficiency of inductor-based power converters is improved through operation in a discontinuous or a transition conduction mode through use of a diode emulation circuit. Referring to FIG. 1, a power stage 100 of a switching power supply is illustrated. Power stage 100 can be operated in discontinuous or transition conduction mode, in which current through an inductor 104 is prevented from becoming negative. A control MOSFET 101 charges inductor 104 when on. When a rectifying MOSFET 102 is turned on, inductor 104 discharges, and current flowing through inductor 104 decreases toward zero. When the current through inductor 104 reaches zero, MOSFET 102 is turned off, thereby preventing current in inductor 104 from becoming negative.

The efficiency obtained by operating power stage 100 in discontinuous or transition conduction mode during light-load operation can be diminished if MOSFET 102 is not turned off when inductor 104 has zero current flowing. For example, if MOSFET 102 is turned off before the current in inductor 104 reaches zero, a body diode of MOSFET 102 conducts, leading to conduction losses that can negatively impact efficiency. If MOSFET 102 is turned off after the current in inductor 104 has passed zero to become negative, the voltage at switching node SW increases sharply to the input voltage level and MOSFET 102 experiences switching losses that negatively impact efficiency.

Accordingly, switching MOSFET 102 off with appropriate timing to permit the current in inductor 104 to reach zero and avoid becoming negative is an important aspect for control of power stage 100. One technique for detecting zero current in inductor 104 involves measuring a voltage across sense resistor Rs. When the voltage across sense resistor Rs becomes zero, as measured by comparator 106 in control 108, an output of comparator 106 changes state. When the voltage of sense resistor Rs becomes zero, the change in state of the output of comparator 106 permits control circuit 108 to supply a signal to turn off MOSFET 102. Ideally, MOSFET 102 is turned off when the current through inductor 104 becomes zero, to limit conduction and switching losses in power stage 100. Zero current in inductor 104 corresponds to zero measured voltage across sense resistor Rs.

However, in practice, comparator 106 has some offset voltage that can deviate during circuit operation. The offset voltage may cause comparator 106 to change state before or after the voltage on sense resistor Rs reaches zero. Thus, the offset voltage and deviations in the value of the offset voltage can degrade circuit performance due to increased conduction and switching losses, as mentioned above.

In addition, control circuit 108, including comparator 106 and a MOSFET driver (not shown), includes some delay in propagating a signal to turn off MOSFET 102. The delay can cause inaccurate timing for turning off MOSFET 102.

Furthermore, sense resistor Rs is specified to have a small resistance to improve heavy load efficiency. During light-load operation, the resistance value of sense resistor Rs has a greater impact on the operation of power stage 100.

One solution to overcome the above challenges is to provide a compensation voltage to comparator 106 to cancel the effects of the offset voltage. Such a compensation voltage can also compensate for a delay in control circuit 108 to improve timing. However, the compensation voltage is typically set once in practice, on a case-by-case basis for each power stage 100, such as may be provided during manufacture. It is difficult to set the compensation voltage accurately with respect to the value of sense resistor Rs to avoid negatively impacting light-load efficiency. In addition, an optimal value for the compensation voltage is dynamic, and varies as a function of external conditions, such as an output voltage and/or inductor characteristics related to temperature or operating parameters, for example. A static compensation voltage is unable to adequately compensate for the dynamic conditions present in power stage 100 under normal operating conditions. Accordingly, during normal operation, power stage 100 experiences a loss in efficiency due to variations in the offset voltage inherent to comparator 106 and variable signaling delays in control circuit 108, which prevent MOSFET 102 from being turned off when inductor 104 has zero current.

BRIEF SUMMARY OF THE INVENTION

The disclosed system and method provide a dynamic adjustment to a comparator controlling switching in an inductor based power supply. The comparator operation is dynamically adjusted to improve the accuracy of a zero crossing detection for inductor current in a switching power supply operating in discontinuous or transition mode to boost the efficiency of the power supply in light load conditions.

According to one exemplary embodiment, a variable compensation voltage is applied to a comparator for detecting a zero crossing for inductor current in a power supply with a synchronous rectifier. The synchronous rectifier may be implemented as a rectifying MOSFET. The compensation voltage applied to the comparator is adjustable in accordance with switch timing, as measured when the rectifying MOSFET turns off, for example. A measure of inductor current can be taken through a sense resistor voltage. If the MOSFET turns off at an appropriate time, the voltage on the sense resistor is zero, indicating zero current through the inductor. If the MOSFET turns off prematurely, the voltage measurement of the sense resistor is positive. If the MOSFET turns off late, the voltage measured on the sense resistor is negative. By setting the compensation voltage applied to the comparator appropriately, sense resistor voltage measurements can be used as a feedback to adjust the compensation voltage to achieve MOSFET turnoff closer to a point of zero inductor current.

According to another embodiment of the disclosed system and method, the timing for turning off a rectifying MOSFET in a switching power supply is adjusted with a compensation voltage offset applied to a comparator input. The comparator measures a voltage across the MOSFET to determine when inductor current approaches zero. The compensation voltage offset applied to the comparator is adjusted so that a switching control signal supplied by the comparator causes the MOSFET to turn off at a point when inductor current reaches approximately zero. According to an aspect of the disclosed system and method, the compensation voltage offset is generated using an up/down counter, a digital output of which is converted to analog to be applied to the comparator.

According to an exemplary embodiment, a rectifying MOSFET in a switching power supply is turned off and, after a suitable delay, a voltage offset generator is updated with information concerning the timing of the zero crossing. If the zero crossing is detected by the comparator later than when the MOSFET is turned off, the voltage offset generator reduces a compensation voltage offset applied to a comparator. In the next switching cycle, the comparator changes state earlier, so that the MOSFET is turned off earlier. If the comparator detects a zero crossing earlier than when the MOSFET is turned off, the voltage offset generator increases the compensation offset voltage applied to the comparator. In the next switching cycle, the comparator changes state later, so that the MOSFET is turned off later. After several switching cycles, the compensation offset voltage is adjusted for appropriate timing to turn off of the MOSFET in close proximity to the zero current crossing, thereby improving and maintaining the zero current crossing detection accuracy.

According to one exemplary embodiment, an up/down counter is used to adjust a digital value for indicating the value of the compensation voltage offset. The up/down counter, together with logic provided to increase or decrease the count, or hold the count value in the up/down counter, forms the voltage offset generator. The digital value provided as an output of the up/down counter is converted into a compensation voltage offset using a digital to analog converter (DAC).

According to an exemplary embodiment, the disclosed system and method provide for detection of a switching node voltage in relation to timing for a rectifying MOSFET turn-off event in a switching power supply. At a specified time in relation to MOSFET turn-off, the switching node voltage is compared to a threshold voltage to determine if the switching node voltage reaches an appropriate value when the MOSFET is turned off. The switching node voltage and the threshold voltage are applied to a comparator, which changes state if the switching node voltage crosses the threshold voltage. A state change in the output of the comparator is used to adjust a compensation voltage offset to be applied to a second comparator that detects zero current through an inductor, such as may be implemented through the use of a sense resistor. The compensation voltage offset is adjusted to change the timing for when the second comparator changes state to cause the rectifying MOSFET to be turned off. According to an aspect of the disclosed system and method, the compensation voltage offset is generated with an up/down counter. An output of the counter is converted from a digital value to an analog value to be used as the compensation voltage offset applied to the second comparator.

According to another embodiment of the disclosed system and method, the timing for turning off a MOSFET in a boost converter configuration is adjusted with a compensation voltage offset applied to a comparator. The comparator measures a voltage across the MOSFET to determine turnoff timing for the MOSFET. According to an aspect of the disclosed system and method, a blanking delay is provided to permit the voltage across the MOSFET to stabilize for a voltage measurement using Rdson. According to another aspect, The compensation voltage offset is generated using an up/down counter, the digital output of which is converted to an analog value to be applied to the comparator.

BRIEF DESCRIPTION OF THE SEVERAL VIEWS OF THE DRAWINGS

The disclosed system and method are described in greater detail below, with reference to the accompanying drawings, in which.

DETAILED DESCRIPTION OF THE INVENTION

This application is based on and claims benefits of provisional application No. 60/940,736, filed May 30, 2007, the entire disclosure of which is hereby incorporated herein by reference.

The disclosed system and method provides an adaptive rectifier configuration that automatically compensates for a comparator offset voltage and a propagation delay in a switching control for a power supply operating in discontinuous or transition conduction mode.

Figure 1:
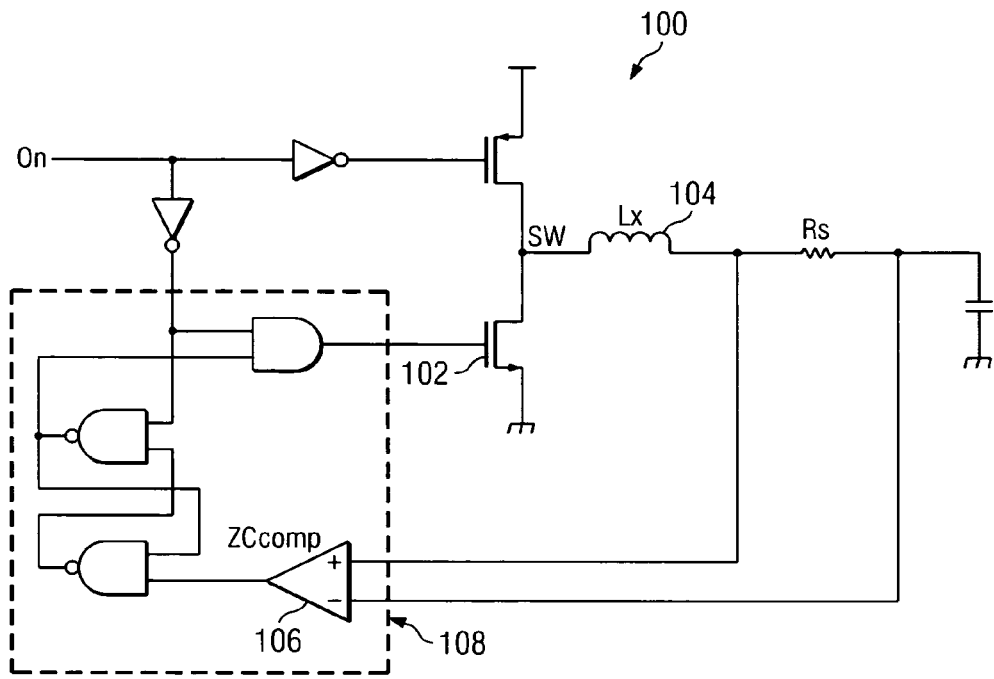
FIG. 1 is a circuit diagram of a power stage of a conventional switching power supply.
Figure 2:
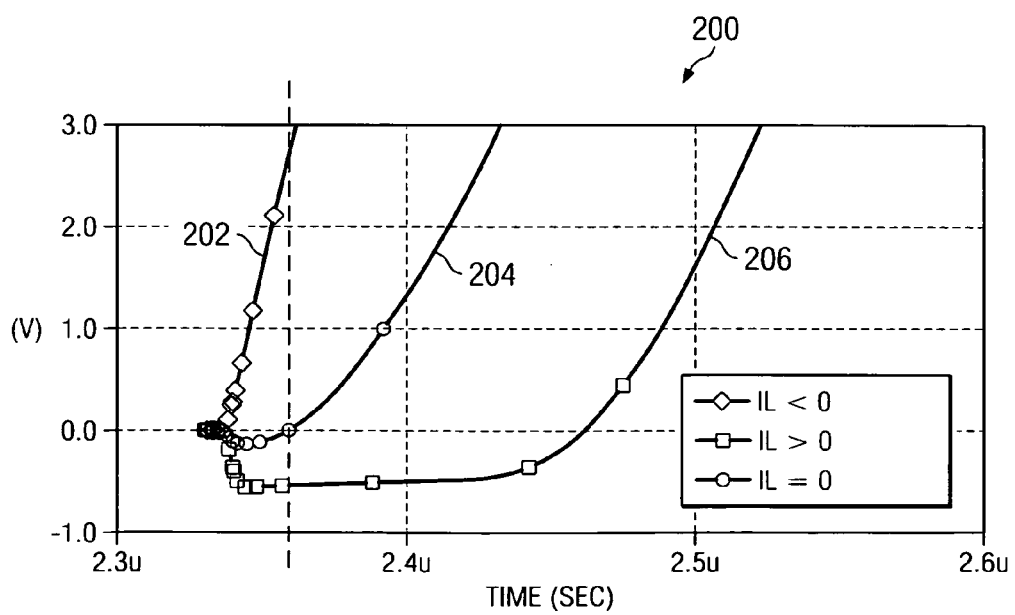
FIG. 2 is a graph illustrating different timing scenarios for switching a synchronous rectifier in a power supply.

Referring now to FIG. 2, a graph 200 illustrates plots of voltage at node SW in power stage 100 in FIG. 1. The voltage plots show voltage in relation to timing for synchronous rectifier turn-off events. Line 202 illustrates synchronous rectifier turn-off after inductor current has become negative. Line 204 illustrates synchronous rectifier turn-off when inductor current is approximately zero. Line 206 illustrates synchronous rectifier turn-off before inductor current has reached zero. In the case of line 202, the synchronous rectifier experiences a voltage spike, in which the voltage at node SW becomes higher than the input voltage. In such an event, a body diode of MOSFET 101 conducts, leading to conduction losses that reduce efficiency. In the case of line 206, a body diode of the synchronous rectifier implemented as MOSFET 102, conducts current, leading to conduction losses that reduce efficiency.

In accordance with the disclosed system and method, premature and late switching of the synchronous rectifier is detected and an adjustment is made to a compensation voltage offset of a comparator that is used to switch the synchronous rectifier. For example, if the switching of the synchronous rectifier is premature, the compensation voltage offset is reduced so that the synchronous rectifier is switched off later, closer to the desired zero crossing point. If the switching of the synchronous rectifier is late, the compensation voltage offset is increased so that the synchronous rectifier is switched off earlier, closer to the desired zero crossing point. By dynamically compensating the voltage offset of the comparator, a switch timing to switch the synchronous rectifier at a desired zero crossing point can be obtained.

Figure 3:
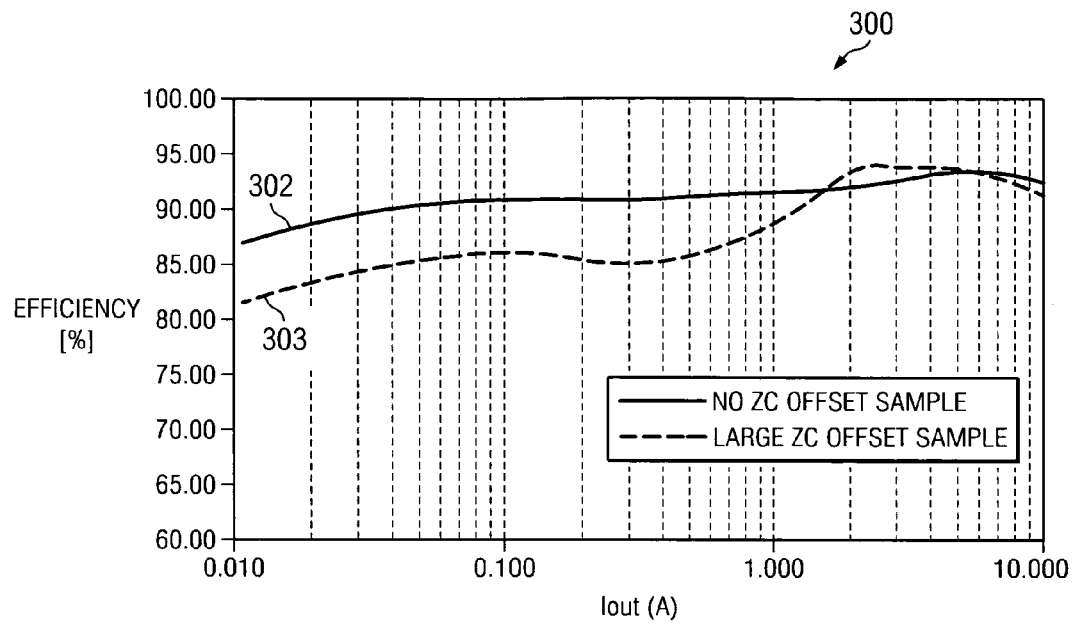
FIG. 3 is a graph illustrating efficiency of a power supply in relation to zero crossing offset.

Referring to FIG. 3, an illustration of a relationship between efficiency and switch timing to obtain a desired zero crossing point is provided. A chart 300 shows a sample A, illustrated by line 302, in which the zero crossing offset is relatively small. A sample B, illustrated by line 303, has a relatively large zero crossing offset. As can be seen in chart 300, power supply efficiency can be greatly improved in light-load conditions with improved accuracy of zero crossing detection and synchronous rectifier switching.

Figure 4:
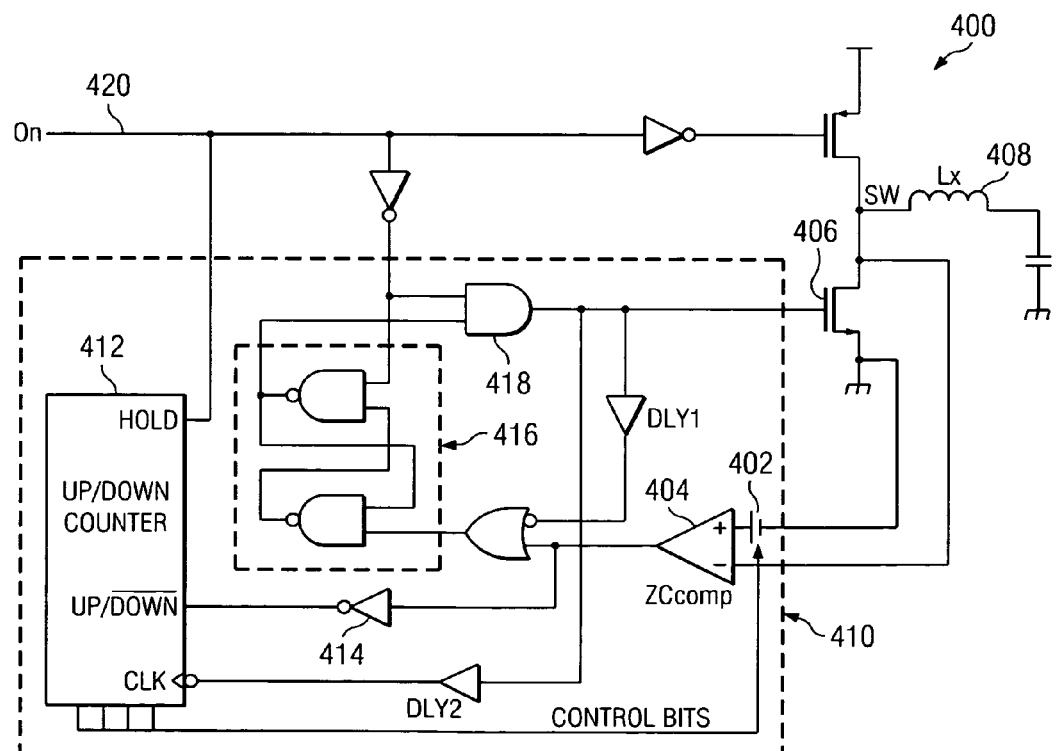
FIG. 4 is a circuit diagram illustrating a dynamic zero crossing offset adjustment in accordance with an exemplary embodiment of the present disclosure.

Referring now to FIG. 4, a power stage 400 for a switching power supply is illustrated with an adjustable compensation offset voltage 402 applied to an input of a comparator 404. An output of comparator 404 is used to cause synchronous rectifier MOSFET 406 to be turned off when current through inductor 408 is approximately zero. Compensation offset voltage 402 and comparator 404 are part of a control circuit 410 used to turnoff MOSFET 406. Control circuit 410 includes an up/down counter 412 that provides a digital value used to control the adjustment to compensation offset voltage 402. An output of comparator 404 is inverted with inverter 414 and provided to counter 412 to indicate when counter 412 should count up or down.

Control circuit 410 also includes a delay Dly1 and a delay Dly2 to contribute to control timing. Delay Dly1 is arranged between a gate of MOSFET 406 and a latch logic 416 and prevents switching transients from causing MOSFET 406 to be turned off prematurely. That is, when MOSFET 406 is first turned on, some transient voltages may be seen on the inverting input of comparator 404. A transient output of comparator 404 may signal latch logic 416 to turn MOSFET off. Delay Dly1 prevents a transient value from being latched by preventing an output of comparator 404 from affecting latch logic 416 when MOSFET 406 first receives a turn on signal. Accordingly, delay Dly1 provides a blanking interval to avoid false switching of MOSFET 406. Delay Dly2 is arranged between the gate of MOSFET 406 and a clock input of counter 412. Delay Dly2 acts like an enable signal to permit counter 412 to count up or count down after the time interval represented by delay Dly2 expires. In an exemplary embodiment, delay Dly2 can be on the order of 50-200 ns. A power supply stage switching control signal 420 is also provided to counter 412 at a hold input.

The operation of control circuit 410 is illustrated by examining a turn-off event for MOSFET 406. Prior to turn-off, MOSFET 406 is conducting, and a drain to source voltage Vds is decreasing as current through inductor 408 decreases towards zero. As voltage Vds decreases beyond a value of compensation offset voltage 402, the output of comparator 404 transitions from a high state to a low state to produce a logic '0' output. The logic '0' output applied to latch logic 416 causes a state change to turn AND gate 418 off, thereby turning off MOSFET 406. When comparator 404 changes to a low state, the timing information contained in the transition is applied to counter 412 through inverter 414.

Accordingly, if the output of comparator 404 is a logic '0' when the clock input to counter 412 provided through delay Dly2 becomes active, counter 412 counts up one count. If the output of comparator 404 is a logic '1' when the clock input to counter 412 provided through delay Dly2 becomes active, counter 412 counts down one count. The digital value of counter 412 is converted to an analog value using a digital to analog converter (DAC) to provide compensation offset voltage 402. In the next switching cycle, comparator 404 changes state earlier or later, depending upon whether compensation offset voltage 402 is increased or decreased, respectively. Thus, compensation offset voltage 402 is adjusted with each switching cycle to advance or retard the timing for MOSFET 406 to be turned off. The timing for MOSFET 406 being turned off therefore approaches a desired zero crossing point for the current in inductor 408. The adjustment for the timing for MOSFET 406 being turned off automatically includes an inherent offset of comparator 404, as well as control signal propagation delays present in control circuit 410.

Figure 5:
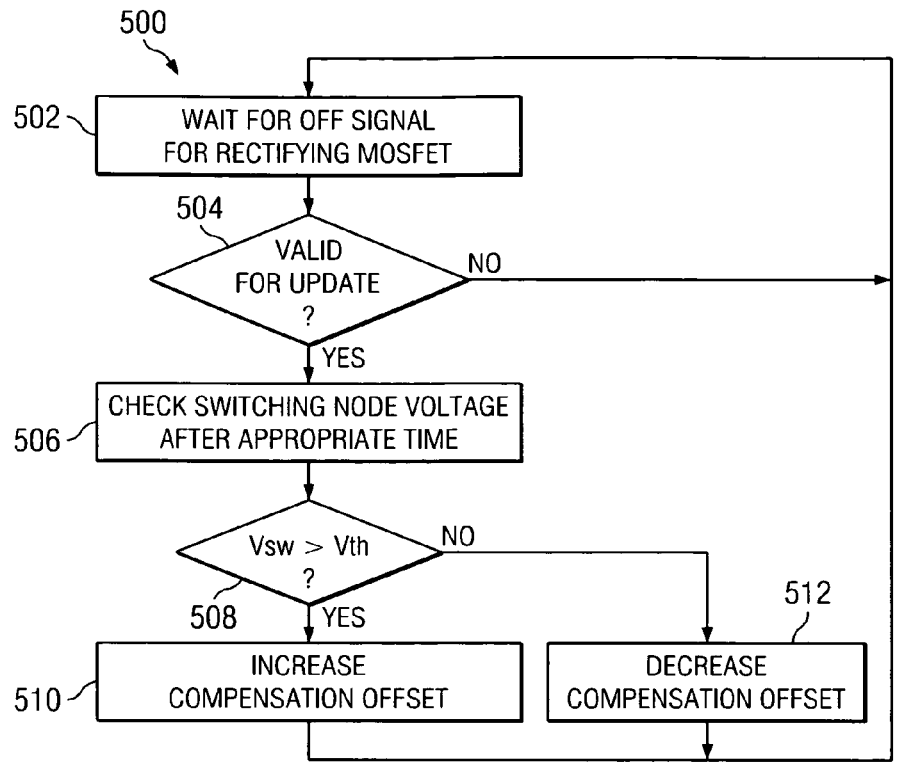
FIG. 5 is a flow chart illustrating a method for dynamic zero crossing offset adjustment in accordance with an exemplary embodiment of the present disclosure.

Referring now to FIG. 5, a flowchart 500 illustrates a process for adjusting a compensation offset voltage in accordance with an exemplary embodiment of the disclosed system and method. Flowchart 500 illustrates how the compensation offset voltage is updated based on a previous switch timing result. A block 502 illustrates a state where the rectifying MOSFET is conducting, and is to be turned off with an appropriate turn-off timing. When the rectifying MOSFET first conducts, the switching node voltage can experience transient voltage values, so that the switching node voltage may not be reliable for control measurements. The transients experienced at the switching node may cause the zero crossing detection comparator to change state, resulting in an invalid control measurement. This situation is avoided by providing a blanking interval on the output of comparator 404 while the switching node voltage stabilizes. Accordingly, while the switching node voltage may appear as though MOSFET 406 is turned off, a transient turnoff signal on the output of comparator 404 does not propagate through latch logic 416 to turn off and gate 418, and therefore avoids a premature or inadvertent turnoff of MOSFET 406. A decision block 504 therefore determines whether the switching node voltage is valid for control measurements. If the rectifying MOSFET was not turned off by the output of the zero crossing detection comparator, the switching node voltage is not valid, control returns to block 502 through the No branch of decision block 504 to await a valid switching node voltage condition. This operation is provided through delay Dly1 illustrated in FIG. 4.

If the rectifying MOSFET was turned off by the zero crossing detection comparator output signal, the switching node voltage is in a valid condition for measurement. In this instance, control proceeds along the Yes branch of decision block 504 to a block 506. Block 506 indicates the measurement of the switching node voltage after an appropriate delay interval. The measurement of the switching node voltage is achieved with comparator 404 in FIG. 4, while the delay interval is realized through delay Dly2. A decision block 508 then determines whether the switch voltage, that is, voltage Vds of MOSFET 406, is greater than the threshold voltage, that is, compensation offset voltage 402. If the switch voltage is greater than the threshold voltage, control proceeds along the yes branch of decision block 508 to a block 510. Block 510 causes the threshold voltage to be increased, and control proceeds back to block 502. If the switch voltage is not greater than the threshold voltage, control proceeds along the no branch of decision block 508 to a block 512. Block 512 causes the threshold voltage to be decreased, and control proceeds back to block 502.

In accordance with the control process illustrated in flowchart 500, the compensation offset voltage is optimized after several switching cycles. The actual compensation offset voltage may continue to fluctuate between different consecutive values represented by Count values in counter 412. By increasing the number of bits or granularity of counter 412, greater precision for the compensation offset voltage can be achieved. In addition, having the value of counter 412 represent a small range of voltage of variation can increase the precision of the compensation offset voltage achieved by the count value determined by counter 412.

It should be apparent that a number of other techniques and configurations may be used to achieve the adjustable compensation offset voltage provided to comparator 404. For example, counter 412 may be replaced with an analog equivalent, such as a storage capacitor with appropriate charging and discharging control circuitry.

Figure 6:
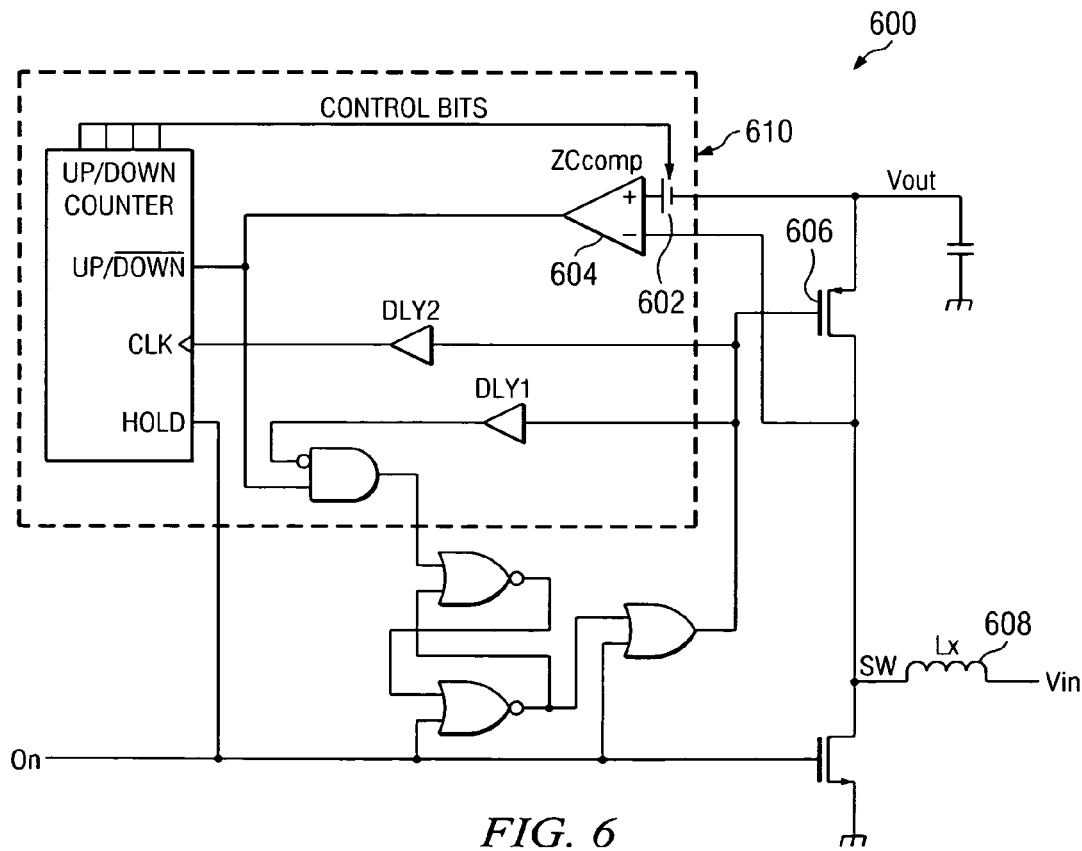
FIG. 6 is a circuit diagram illustrating a dynamic zero crossing offset adjustment for a boost converter in accordance with an exemplary embodiment of the present disclosure.

Referring now to FIG. 6, an exemplary embodiment of an implementation of the disclosed system and method for a boost converter 600 is illustrated. The operation of a control circuit 610 is substantially similar to that of control circuit 410, with the appropriate logic inversions used to control a turn-off of p-channel MOSFET 606. Comparator 604 measures voltage Vds of MOSFET 606 to determine when to provide a turn-off signal to cause MOSFET 606 to be turned off. A compensation voltage offset 602 is adjusted based on a turn-off timing detected with respect to inductor 608 having zero current.

Figure 7:
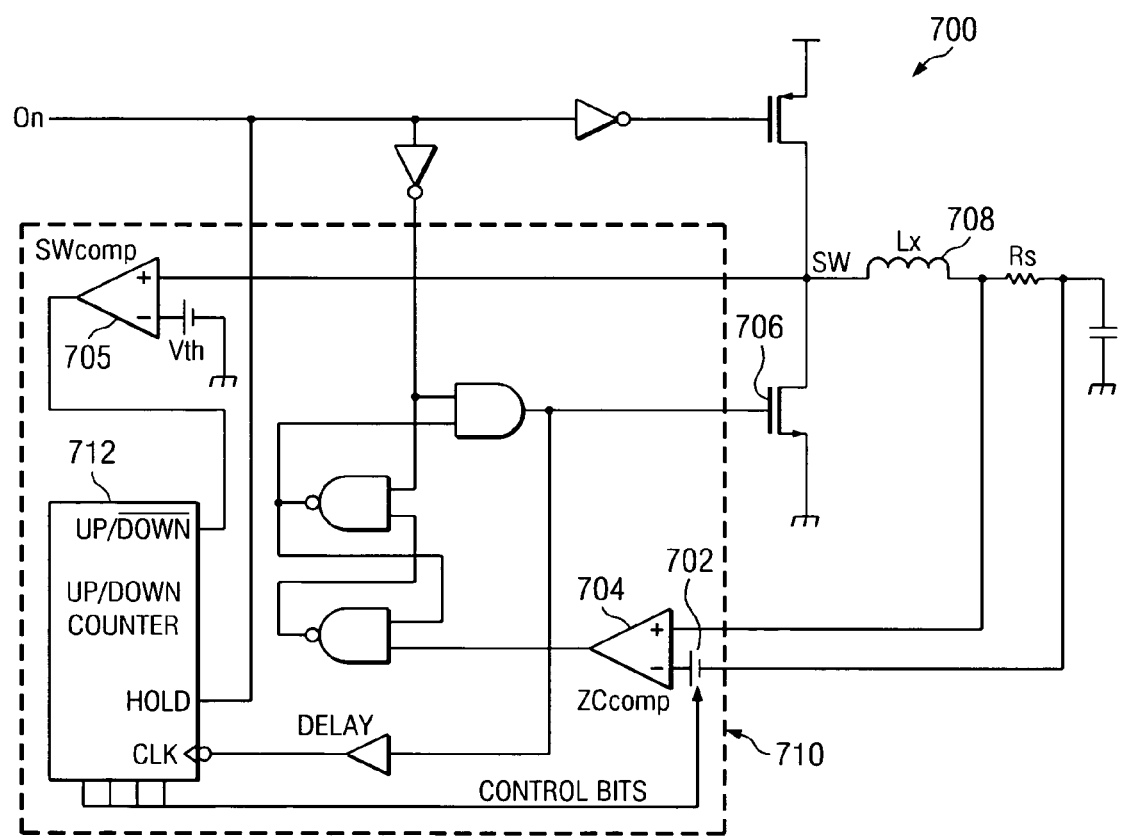
FIG. 7 is a circuit diagram of a dynamic zero crossing offset adjustment using a sense resistor in accordance with an exemplary embodiment of the present disclosure.

Referring now to FIG. 7, a power stage 700 for a switching power supply has a rectifying MOSFET 706 that is controlled to be turned off when inductor 708 has zero current. A control circuit 710 includes two comparators 704 and 705 four turning off the MOSFET 706 and adjusting a compensation offset voltage, respectively. Comparator 705 monitors a switching node voltage SW in relation to a threshold voltage Vth. An output of comparator 705 is provided to an up down counter 712 to adjust a digital value used to provide a compensation offset voltage 702. Control circuit 710 permits the use of a sense resistor Rs, as may be used in currently existing power supply configurations, so that the disclosed system and method is adaptable for power supplies presently being used. In addition, control circuit 710 11 at the use of a delay element such as delay Dly1 illustrated in FIG. 4.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A control system for turning off a synchronous rectifier in an inductor-based power converter, comprising:
    a comparator having an input coupled to an inductor in the power converter to obtain an indication of substantially zero inductor current, and having an output coupled to the synchronous rectifier to switch off the synchronous rectifier to reduce or eliminate negative inductor current;
    an adjustable compensation offset voltage source coupled to an input of the comparator;
    a compensation offset voltage source controller operating only in a discontinuous or transition mode coupled to the output of the comparator and to the compensation offset voltage source and being operable to adjust an output value of the compensation offset voltage source for an offset voltage of the comparator and propagation delays in the control system by determining a timing relationship between a transition of the output of the comparator and the indication of substantially zero inductor current; and
    an up/down counter provided as the compensation offset voltage source.

2. The system according to claim 1, further comprising a MOSFET as the synchronous rectifier.

3. The system according to claim 1, further comprising a delay element coupled to the synchronous rectifier and the compensation offset voltage source to provide a delay in obtaining the indication of inductor current.

4. The system according to claim 1, further comprising a digital to analog converter (DAC) coupled to the compensation offset voltage source controller and the compensation offset voltage source to convert a control signal from the compensation offset voltage source controller to the compensation offset voltage source.

5. The system according to claim 1, wherein the compensation offset voltage source controller is further operable to adjust the compensation offset voltage source to have a greater output value if the transition of the output comparator is subsequent to the indication of inductor current being substantially zero, and is further operable to adjust the output value of the compensation offset voltage source to have a lesser value if the transition of the output of the comparator is prior to the indication of the inductor current being substantially zero.

6. The system according to claim 1, further comprising a sense resistor coupled to the inputs of the comparator.

7. The system according to claim 1, wherein the inputs to the comparator are arranged to be across the synchronous rectifier.

8. A method for controlling a synchronous rectifier in an inductor-based power converter, the method comprising:
    turning the synchronous rectifier off in order to reduce or eliminate negative inductor current;
    obtaining an indication of substantially zero current in an inductor in the power converter;
    if the indication shows that the power converter is in discontinuous or transition mode, comparing the indication to a compensation offset voltage; and
    modifying the compensation offset voltage using an up/down counter for an offset voltage of the comparator and propagation delays in the control system by determining a synchronous rectifier turn-off timing in relation to a predetermined value of the indication.

9. The system according to claim 8, wherein the predetermined value is a positive voltage value.

10. The system according to claim 8, further comprising implementing the synchronous rectifier as a MOSFET.

11. The system according to claim 8, further comprising delaying the obtaining of the indication.

12. The system according to claim 8, further comprising converting an output of the up/down counter to an analog signal to provide the compensation offset voltage.

13. The system according to claim 8, further comprising adjusting the compensation offset voltage to have a greater output value if the synchronous rectifier turn-off is subsequent to the indication of the value of current in the inductor becoming substantially zero, and adjusting the compensation offset voltage to have a lesser value if the synchronous rectifier turn-off is prior to the value of current in the inductor becoming substantially zero.

14. The system according to claim 8, further comprising using a sense resistor for the obtaining the indication of the value of current in the inductor.

15. The system according to claim 8, further comprising using the synchronous rectifier for the obtaining the indication of the value of current in the inductor.

16. A control system for turning off a synchronous rectifier in an inductor-based power converter, comprising:
    comparator means having an input coupled to an inductor in the power converter for obtaining an indication of substantially zero inductor current, and for determining a direction of inductor current by monitoring a switch node when the synchronous rectifier is turned off and having an output coupled to the synchronous rectifier to switch off the synchronous rectifier;

an adjustable compensation offset voltage source coupled to an input of the comparator;

a compensation offset voltage source controller operating only in a discontinuous or transition mode coupled to the output of the comparator means and to the compensation offset voltage source and being operable to adjust an output value of the compensation offset voltage source for an offset voltage of the comparator and propagation delays in the control system by determining a timing relationship between a transition of the output of the comparator and the indication of substantially zero inductor current; and an up/down counter provided as the compensation offset voltage source.

17. The control system of claim 16 wherein the comparator means is a single comparator.

18. A method for controlling a synchronous rectifier in an inductor-based power converter, the method comprising:

turning the synchronous rectifier off;

obtaining an indication of substantially zero current in an inductor in the power converter and a direction of current flow when the synchronous rectifier is turned off from comparator means;

if the indication shows that the power converter is in discontinuous or transition mode, comparing the indication to a compensation offset voltage; and modifying the compensation offset voltage using an up/down counter for an offset voltage of the comparator and propagation delays in the control system by determining a synchronous rectifier turn-off timing in relation to a predetermined value of the indication.

19. The method of claim 18 wherein the comparator means is a single comparator.

* * * * *